(No Model.)

2 Sheets—Sheet 1.

C. C. PALMER.
Ice Machine.

No. 239,666.

Patented April 5, 1881.

(No Model.) 2 Sheets—Sheet 2.

C. C. PALMER.
Ice Machine.

No. 239,666. Patented April 5, 1881.

Witnesses
J. L. Boone
Wm. F. Clark

Inventor:
Cassius C. Palmer
by his Attys.,
Boone & Osborn

UNITED STATES PATENT OFFICE.

CASSIUS C. PALMER, OF OAKLAND, CALIFORNIA.

ICE-MACHINE.

SPECIFICATION forming part of Letters Patent No. 239,666, dated April 5, 1881.

Application filed March 22, 1880. (No model.)

*To all whom it may concern:*

Be it known that I, CASSIUS C. PALMER, of Oakland, county of Alameda, and State of California, have invented certain new and useful Improvements in Ice-Machines; and I do hereby declare that the following is a full, clear, and exact description thereof, reference being had to the accompanying drawings.

My invention has reference to machines for making ice by the vaporization of a volatile liquid; and it consists, first, of an improved method of and apparatus for supplying a thin film of water to the freezing-surface, so as to facilitate the freezing operation and make a better quality of ice, all as hereinafter more fully described.

Figure 1:
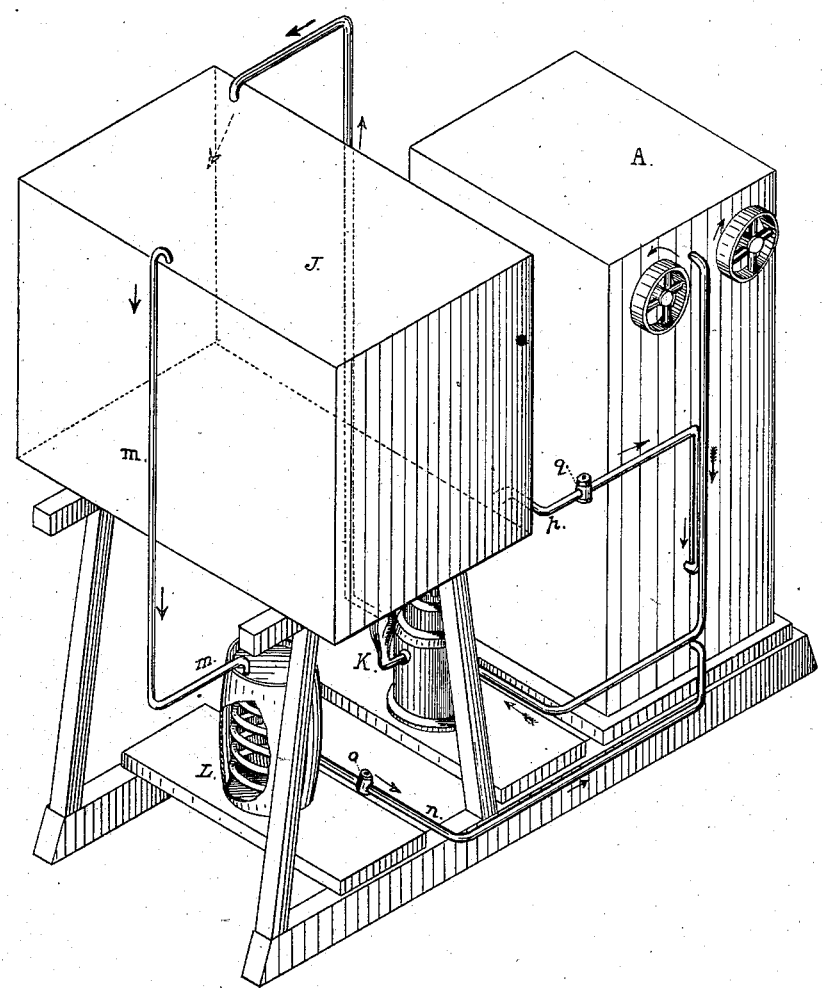
Figure 2:
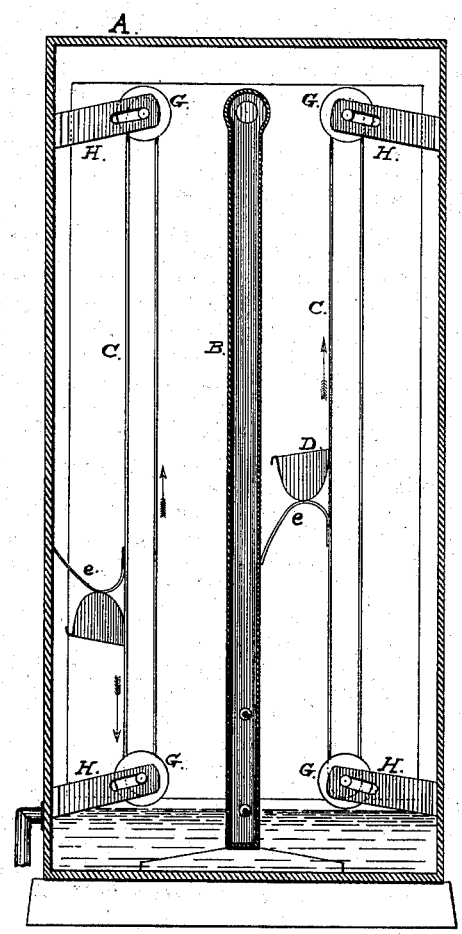
Figure 3:
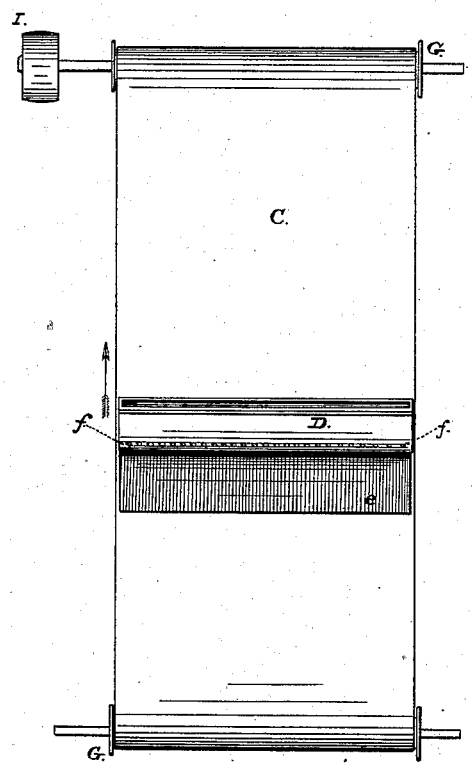

Referring to the accompanying drawings, Figure 1 is an isometrical view of my improved machine or apparatus. Fig. 2 is a detail view, in vertical section, taken transversely through the refrigerating-tank and freezing-cell. Fig. 3 is a detail view of the endless apron that operates the water-buckets.

Let A represent the tank in which the water and freezing-cells B are contained. The volatile liquid is expanded inside of the cells B, and the sides of the cells form the plates on which the ice is frozen and accumulated.

By the ordinary method of operating these machines the tank A is filled with water to the tops of the cells, and the entire quantity of water must be kept at a low temperature in order to form ice on the plates. Another method has been to spray the water upon the plates and surface of the ice. By this method the freezing process is somewhat accelerated; but the temperature of the water, unless it be used over and over again, is not sufficiently reduced to give the best results; and, besides, the spraying operation causes the water to become aerated, and consequently the ice is often snowy or opaque.

By my invention I employ only a small quantity of water in the bottom of the tank. I then arrange a vertically-moving endless belt, C, on each side of the cell, and on each endless belt I secure a number of buckets, D. The lower end of this belt extends into the water in the bottom of the tank, so that as the buckets pass around the lower roller they will fill themselves with water. Attached to the front side of each bucket is a flexible brush or apron, e, which presses lightly against the plate as the buckets move upward. A number of holes or perforations, f, are made in the front of each bucket, above the endless apron, so that the water in the bucket will ooze out and run down the flexible brush or apron and pass in a thin film between the apron and plate and run down the surface against which the apron presses. The endless belt is as wide as the plate or cell, and it passes around rollers G at top and bottom. The buckets extend entirely across the belt, so that the water will be distributed equally and uniformly to the freezing-surface.

The journals of the rollers G may bear in the ends of the tank, or special bearing-plates H H may be provided. The holes in which the journals bear are elongated at right angles to the freezing-surface, so that as the ice grows in thickness on the plates the pressure of the buckets against the surface of the accumulated ice will force the rollers and belt back. To prevent the upper edges of the buckets from scraping against the surface of ice I bend them over, so that they form a curve and present a rounded face to the ice-surface. The belts are driven by power applied to pulleys I I on the outside of the tank.

The best apron or brush that I have been able to find is a thin plate or piece of india-rubber attached to the front side of each bucket so that it will project outward and downward at an angle, and thus wipe against the freezing-surface. I do not confine myself, however, to any particular kind of brush or apron.

As above stated, I employ only a small quantity of water in the bottom of the tank, and this water I use over and over again, so that it is maintained at a temperature near the freezing-point. This method of raising the water from the well or bottom of the tank and applying it in a thin film to the freezing-surface greatly facilitates the freezing process. The water never leaves the tank, but is kept passing in a continual film over the freezing-surface in a uniform manner, so that the ice will form much more rapidly than if the water is sprayed or frozen in bulk, and the resulting ice is perfectly clear and crystal.

When a batch of ice has been completed I draw off the gas from the top of the condenser J and cause it to pass through a heater, L, and thence into the cells between the plates, so as to heat the plates, and thus detach the blocks of ice. This is accomplished by the same pump, K, which circulates the gas for freezing. The top of the heater L is connected by a pipe, $m$, with the top of the condenser, while its bottom is connected by a pipe, $n$, with the cell.

During the freezing operation the cock $o$ on the pipe $n$ is kept closed, so that the gas is forced through the condenser and liquefied, from whence it is forced through the pipe $p$ into the cells, to expand into a vapor again; but in detaching the ice from the plates I close the cock $q$ on the pipe $p$, which conducts the liquid to the cells, and open the cock $o$ on the pipe $n$. The gas, instead of passing through the condenser, will then pass from the top of the condenser down through the heater, and thence into the cells. I thus free the ice from the plates by means of the same gas that I use for making it.

Having thus described my invention, what I claim, and desire to secure by Letters Patent, is—

1. In combination with the tank A and freezing-cell B, the vertically-moving endless belts C, with their perforated buckets D, each of which is provided with a flexible brush or apron, $e$, substantially as above described.

2. The vertically-moving endless belt C, passing around rollers G, the journals of which bear in elongated openings or slots, which extend at right angles to the freezing-surface, said belt being provided with the water-buckets D and brushes or aprons $e$, substantially as and for the purpose described.

3. In combination with the freezing-cell B, pump K, and condenser J of an ice-machine, the heater L, the pipe $m$, connecting it with the top of the condenser, the pipe $n$, connecting it also with the cell B, and having a cock, $o$, and the pipe $p$, having a cock, $q$, whereby the gas can be drawn off from the condenser and be compelled to pass back through the heater and into the cell, substantially as and for the purpose set forth.

In witness whereof I have hereunto set my hand and seal.

CASSIUS CLAY PALMER. [L. S.]

Witnesses:
WM. F. CLARK,
EDWARD E. OSBORN.